United States Patent [19]

Cunningham et al.

[11] Patent Number: 4,850,402
[45] Date of Patent: Jul. 25, 1989

[54] SYSTEM FOR CONTROLLING THE INFLATION OF TIRES

[75] Inventors: Charles L. Cunningham, Nashville; Robert E. Gwaltney, Brentwood, both of Tenn.

[73] Assignee: Hennessy Industries, Inc., LaVergne, Tenn.

[21] Appl. No.: 114,299

[22] Filed: Oct. 28, 1987

[51] Int. Cl.$^4$ ............... B65B 31/00; B06C 23/00; B06C 25/00

[52] U.S. Cl. ............... 141/38; 73/146.3; 137/223; 141/83; 157/1.1; 222/638

[58] Field of Search ............... 152/415, 427; 137/222, 137/624.11; 251/295; 200/61.25; 141/38, 83; 157/1, 61; 307/9, 10 R, 141, 118, 141.4, 141.8; 222/638, 642; 73/146.2, 146.3

[56] References Cited

U.S. PATENT DOCUMENTS

| | | | |
|---|---|---|---|
| 2,761,601 | 9/1956 | Vooren | 141/38 X |
| 3,866,654 | 2/1975 | Duquesne | 137/223 X |
| 3,937,264 | 2/1976 | Mikovits et al. | 157/1.1 |
| 4,456,038 | 6/1984 | Gwaltney et al. | 152/415 |
| 4,510,979 | 4/1985 | Hjorth-Hansen | 141/38 X |
| 4,640,331 | 2/1987 | Braun | 152/427 X |
| 4,744,402 | 5/1988 | St-Hilaire | 157/1.1 |

OTHER PUBLICATIONS

Brochure of the Ahcon Air-Robot and Ahcon AJ-82.
Brochure of the FMC 85/8600 Series Tire Changers.

*Primary Examiner*—Michael W. Ball
*Assistant Examiner*—Thomas Bokan
*Attorney, Agent, or Firm*—Neuman, Williams, Anderson & Olson

[57] ABSTRACT

An improved system is provided for use with a tire changer to regulate and control the inflation of pneumatic tires. This system regulates the flow of air in an air supply conduit through which pressurized air flows from a supply source to an outlet such as an air hose and chuck which an operator connects to a pneumatic tire. The system includes a first and second valve serially connected to the air supply conduit. A foot pedal activating member opens the first valve and closes a switch which activates a timer. The timer opens the second valve for a first predetermined time period and then maintains it in a closed position for a second predetermined time period. During the first period, the air flows through the conduit under relatively high pressure to inflate a pneumatic tire. During the second period, the second valve prevents the flow of air so that the system may stabilize and indicate the pressure in the pneumatic tire. Tire pressure is sensed by an air gauge connected to the air supply conduit and also by a high pressure switch. The foot switch is a reset switch which does not initiate an inflating/measuring cycle unless the operator releases the activating member and then again actuates the rest switch. If the high pressure switch indicates a tire pressure above a preset maximum, then further actuation by the foot pedal will be ineffective.

8 Claims, 3 Drawing Sheets

SYSTEM FOR CONTROLLING THE INFLATION OF TIRES

BACKGROUND OF THE INVENTION

1. Field of the Invention

The present invention relates generally to an apparatus for controlling the inflation of pneumatic tires. Specifically, it relates to a system which regulates the inflation of pneumatic tires by controlling the duration of each inflation period, providing a pressure reading after each inflation period and checking for over inflation after each period, preventing an additional inflation period without manual intervention, and initiating a further inflation/pressure reading cycle upon release and reengagement of an activating member.

2. Description of the Prior Art

Many tire changers include air inflation systems for inflating pneumatic tires which they process. Preferably, these systems should inflate the tires to the desired pressure level quickly. Compressible fluids such as air can store a substantial amount of energy which releases in a destructive manner upon rupture of the vessel which contains them. Utilizing a substantial pressure differential between the fluid source and the tire or other vessel being charged increases the speed of charging but may also increase the potential energy stored in the system.

One prior method for inflating pneumatic tires includes using an air chuck and a visual pressure meter to perform alternate inflating and measuring steps and, if necessary, alternate bleeding and measuring steps until the air pressure in the tire reaches a desired level. However, this method lacks the accuracy in many modern applications. It also requires that the operator exert a great deal of effort and attention to properly perform the procedure.

The prior art also includes complex electrical control systems which automatically perform the procedure outlined in the previous paragraph. But these systems are unsuitable for the environment under which they must operate. Furthermore, these systems are costly to manufacture and repair. Other prior systems practice procedures with alternating inflating and measuring cycles, but they automatically continue to repeat these cycles. Thus, the operator may unintentionally inflate to a hazardous level.

The improved regulating system of the present invention avoids the problems of the prior art regulating systems. It inflates pneumatic tires with manually initiated cycles of alternate inflating and measuring steps and provides increased safety by requiring repeated manual intervention during the inflation cycle series. It provides a construction which minimizes the expense of manufacture and assembly and allows the operator to quickly and safely inflate a pneumatic tire to a desired pressure level using optimum differential pressures with optimum safety.

SUMMARY OF THE INVENTION

It is, therefore, a general object of the present invention to provide an improved system for regulating the inflation of pneumatic tires.

It is a more specific object of this invention to provide an improved system for regulating the inflation of pneumatic tires so that an operator may quickly and safely inflate the tires.

It is another object of the present invention to provide an improved system which requires that an operator inflate a tire by manually initiating each cycle of a series of inflating/measuring cycles.

It is yet another object of this invention to provide an improved tire inflation control system with a construction which minimizes the expense of manufacture and assembly and gives reliable performance utilizing optimum air source pressures with optimum safety.

Other objects, advantages and features of the present invention will become apparent upon reading the following detailed description and appended claims, and upon reference to the accompanying drawings.

In accordance with one embodiment of the present invention, an improved system which regulates the inflation of pneumatic tires and which achieves the foregoing objects controls the flow of pressurized air through a supply conduit. This system operates with any conventional tire changer, and the tire changer supports all of its components. The system includes an air supply conduit for connection to an optimum supply source and an outlet in the form of an air hose and chuck which an operator connects to a pneumatic tire or the like. There is a first valve connected to the supply conduit which is manually operable so that an operator can place it in an open mode to allow flow through the conduit to the inflation control system and in a closed mode to prevent the flow.

The system includes a second valve serially connected to the air supply conduit through the first valve. A programmed timer controls the second valve. The second valve is preferably an electric solenoid valve although equivalent mechanical or pneumatic controls could be used. The output of the second valve is connected to the air hose and chuck with a pressure sensitive device and a manual release valve therebetween.

The timer opens the second valve for a first predetermined time period and then closes it for a second minimum predetermined time period. During the first period (the inflation period), air flows through the air supply conduit and air hose into the pneumatic tire. During the second time period (the measuring period), the second valve stops the flow of pressurized air to the tire. The pressurized air in the pneumatic tire activates an air gauge disposed between the second valve and the outlet of the supply conduit, that is, the air hose. The air gauge indicates the air pressure in the pneumatic tire. A pressure responsive switch also senses air pressure but it does so adjacent the second valve after a short time comparable to the measuring period, for stabilization and high pressure limit control.

For actuating the timer, the system preferably includes a reset switch connected to the timer and an activating member which operates the switch and the first valve. The activating member is preferably manual operated by a pedal or hand control. The activating member moves between a first reset position and a second activated position. In the second position, it engages the first valve and opens it, allowing pressurized air to flow through the supply conduit. It also activates the reset switch which activates the timer. Upon actuation, the timer opens the second valve for the first predetermined time period then closes it for at least the second time period. The reset switch does not actuate the timer again unless the operator permits the activating member to assume the reset position and then moves it to the activated position again. Thus, the operator cannot initiate another cycle unless he or she disengages the activating member (moves it to the first position), and then reengages it (moves it to the second position).

In one preferred embodiment of the present invention, a pressure regulator (not shown) may be serially connected to the air supply line between the first and second valves to reduce the line pressure and protect the solenoid valve, i.e., the second valve. However, because of the control provided by this system the regulator may be set to provide a relatively high source pressure and consequent differential pressure, or the regulator may be omitted altogether. This enhances the speed of the system. The pressure sensitive device is disposed between the second valve and the air hose and provides a control mechanism and an additional safety feature for the system. It responds to the pressure in the conduit which is connected to the air hose and the pneumatic tire. If the pressure exceeds a predetermined level during the off cycle the pressure switch provides a signal to which the timer responds. In response to that signal, the timer maintains the second valve in the closed position.

To operate the system, an operator uses the activating member to open the first valve and close the timer switch. Air flows to the second valve; and the timer opens the second valve to initiate an inflating period. The timer opens the second valve for a first predetermined time period provided the pressure in the pneumatic tire as indicated by the preset pressure switch remains below a predetermined level. At the end of the first period, the timer closes the solenoid valve, allowing the operator to read the air pressure gauge during the minimum closed time and the pressure switch to sense for excessive pressure.

To initiate a second inflation cycle, the operator disengages the activating member, allowing the electrical switch to reset. Then the operator reengages the activating member opening the first valve and closing the timer switch, which in turn opens the second valve, allowing air to flow to initiate a second inflation cycle. The operator repeats these procedures until the pressure in the pneumatic tire reaches a desired level as indicated on the gauge. If during these procedures, the air pressure in the pneumatic tire exceeds the desired level, the operator bleeds the tire to the desired final tire pressure using a release valve disposed between the second valve and the outlet of the air supply conduit. While in the preferred embodiment of the invention, electrical switches, solenoid valves and an electronic timer are used, it should be clear that the same control and timing could be accomplished with mechanical and pneumatic devices.

BRIEF DESCRIPTION OF THE DRAWING

For a more complete understanding of the present invention one should now refer to the embodiment illustrated in greater detail in the accompanying drawings and described below by way of an example of the invention. In the drawings.

Figure 1:
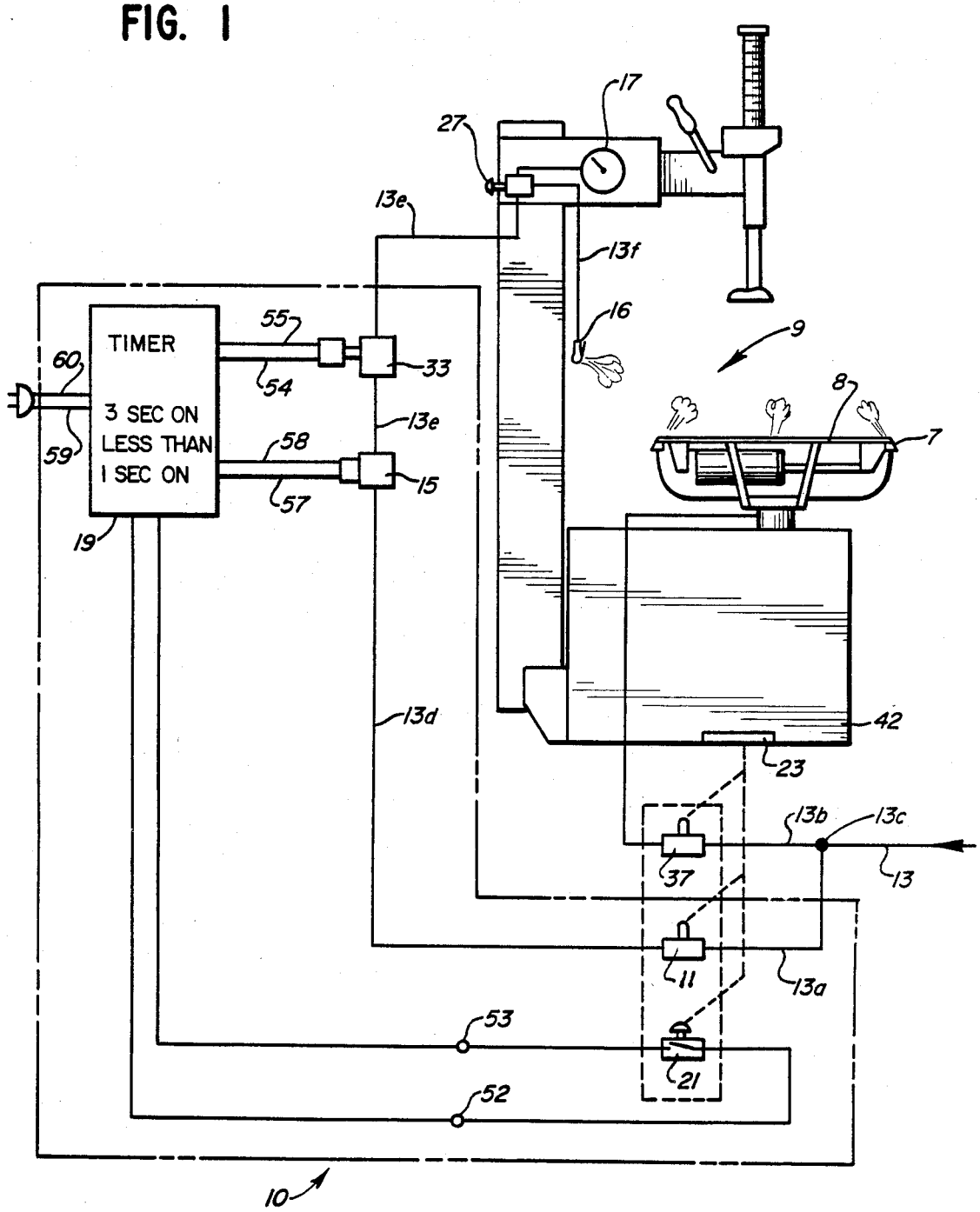
FIG. 1 is a schematic view of a preferred embodiment of an improved system for regulating the inflation of pneumatic tires.

While this text describes the invention in connection with a preferred embodiment, one should understand that the invention is not limited to this preferred embodiment. Furthermore, one should understand that the drawings are not necessarily to scale and that the drawings illustrate the embodiment by graphic symbols and diagrammatic representations.

DETAILED DESCRIPTION OF THE DRAWING AND A PREFERRED EMBODIMENT

Turning now to the drawing, FIG. 1 shows the preferred embodiment of an improved system 10 for regulating the inflation of a pneumatic tire in association with a full power tire changer 9. This system operates with any conventional tire changer, and the tire changer supports all of the system components. The system regulates the flow of pressurized air through a conduit 13 and produces a cycle which comprises a period of air flow followed by a period during which air flow is precluded and the system measures and indicates the air pressure in the pneumatic tire. An operator can repeat this cycle by manually activating the system, but only after the complete cycle as described below.

The air supply conduit 13 receives the pressurized air from a supply source (not shown) with or without a pressure regulator through an inlet to both seal and inflate a tire which would rest upon the table 8. The operator initially actuates the foot pedal 23 to a partially depressed position. This first opens the small valve 11 which constitutes the first valve in the inflation system and, upon further depression, actuates the larger valve 37 which provides air to the bead sealing system diagrammatically indicated as air jets 7 around the table 8. These air jets provide initial bead sealing in a well known manner.

Figure 2:
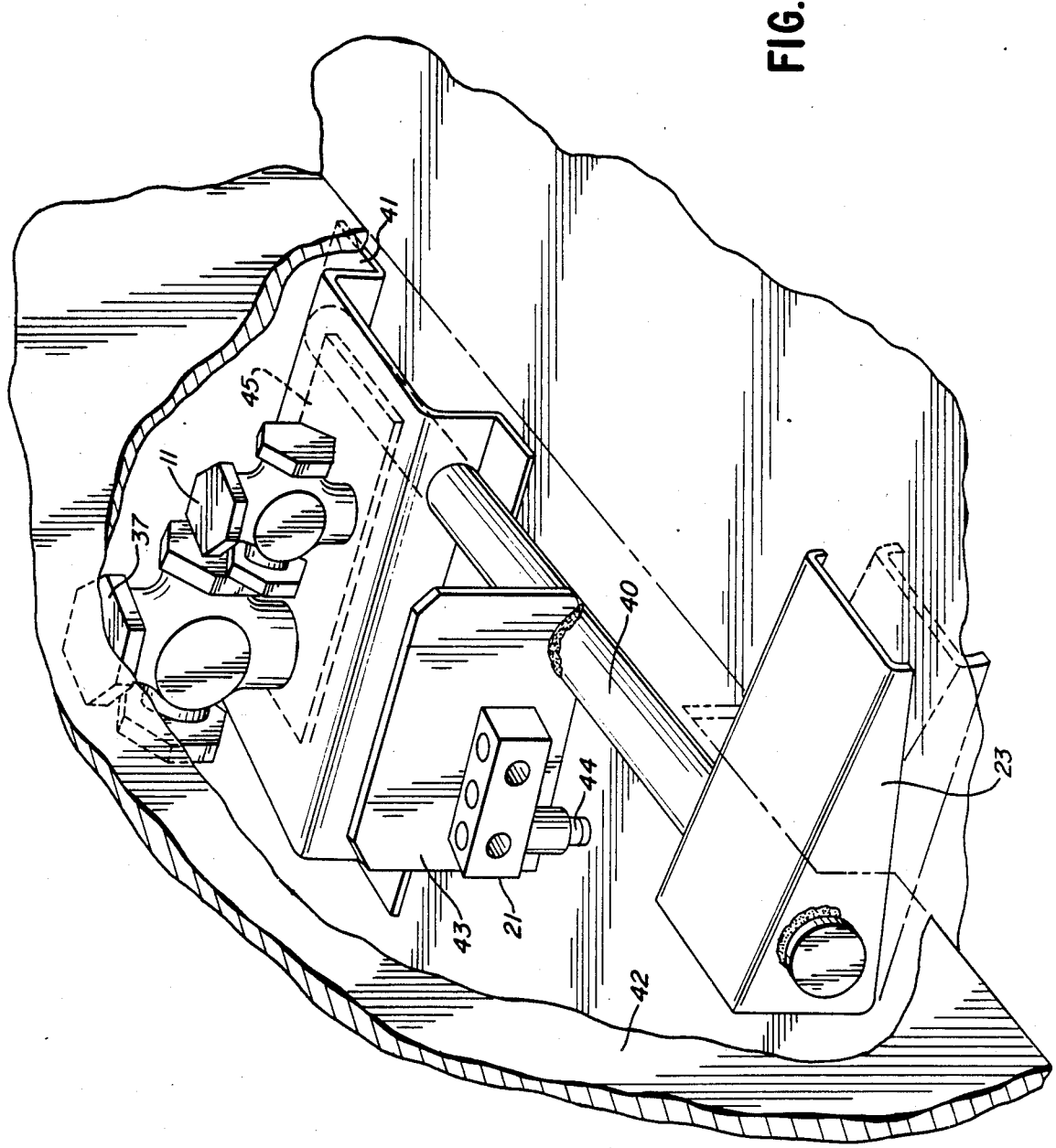
FIG. 2 is a diagrammatic view of the actuating member, in this case a pedal control.

At the time first valve 11 opened, the switch 21 is also closed to actuate the control system. The relationship between the actuator 23 and the valves and switch are shown in FIG. 2. The actuator 23 is a pedal secured to shaft 40 for rotation in bracket 41. Bracket 41 is in turn rigidly mounted in the housing 42 of the tire changer 9 so that the pedal 23 extends from housing 42 and the shaft 40 lies generally parallel to the front of housing 42 and concealed therein. Shaft 40 has a switch plate 43 secured thereto which in turn carries momentary contact, normally closed switch 21 thereon. The pedal 23 is spring biased to the "up" position so that the actuator 44 of switch 21 is urged against the base of changer housing 42 and thus maintained in the actuated or open condition. Upon partially depressing the actuator member pedal 23, the shaft 40 rotates clockwise as viewed in FIG. 2 and the actuator 44 of switch 21 is free to move to its unactuated or closed position.

A flat plate 45 (shown in broken lines) is also secured to and rotatable with the shaft 40. Upon depressing the pedal 23, plate 45 rotates clockwise and actuates both valves 11 and 37. The positions of switch 21 and valves 11 and 37 are all adjustable by means not shown for controlling the sequencing of those devices. Switch 21 and inflation valve 11 are actuated at about the same time while further depression of pedal 23 is required to actuate the bead seal valve 37.

Returning now to FIG. 1, the pneumatic arrangement will be described in greater detail. The air supply conduit 13 is connected to a supply source which may provide air pressure in the range of 100 psi to 180 psi, regulated or unregulated. The supply conduit 13 divides into branches 13a and 13b at 13c. The branch 13b supplies supplies pressurized air through valve 37 to the tire changer for bead sealing a tire to a rim resting on table 8. The branch 13a supplies pressurized air for inflating the tire once bead sealing has occurred.

The system 10 generally comprises the first valve 11 serially connected to the air supply conduit 13a, a second valve 15 connected through air supply conduit 13d to the first valve 11 which is in turn connected through conduit 13e, pressure responsive switch 33, bleed valve 27 and air hose 13f to an air chuck 16. Air chuck 16 defines the outlet for the system and connects it to a pneumatic tire (not shown). An air gauge 17 is disposed between the second valve 15 and the chuck 16 in conjunction with the bleed valve 27. A timer 19 controls the second valve in response to the electric switch 21. The activating foot pedal 23, which a user operates, opens the valve 11 and closes the switch 21 as well as opening the valve 37 to be described later.

Figure 3:
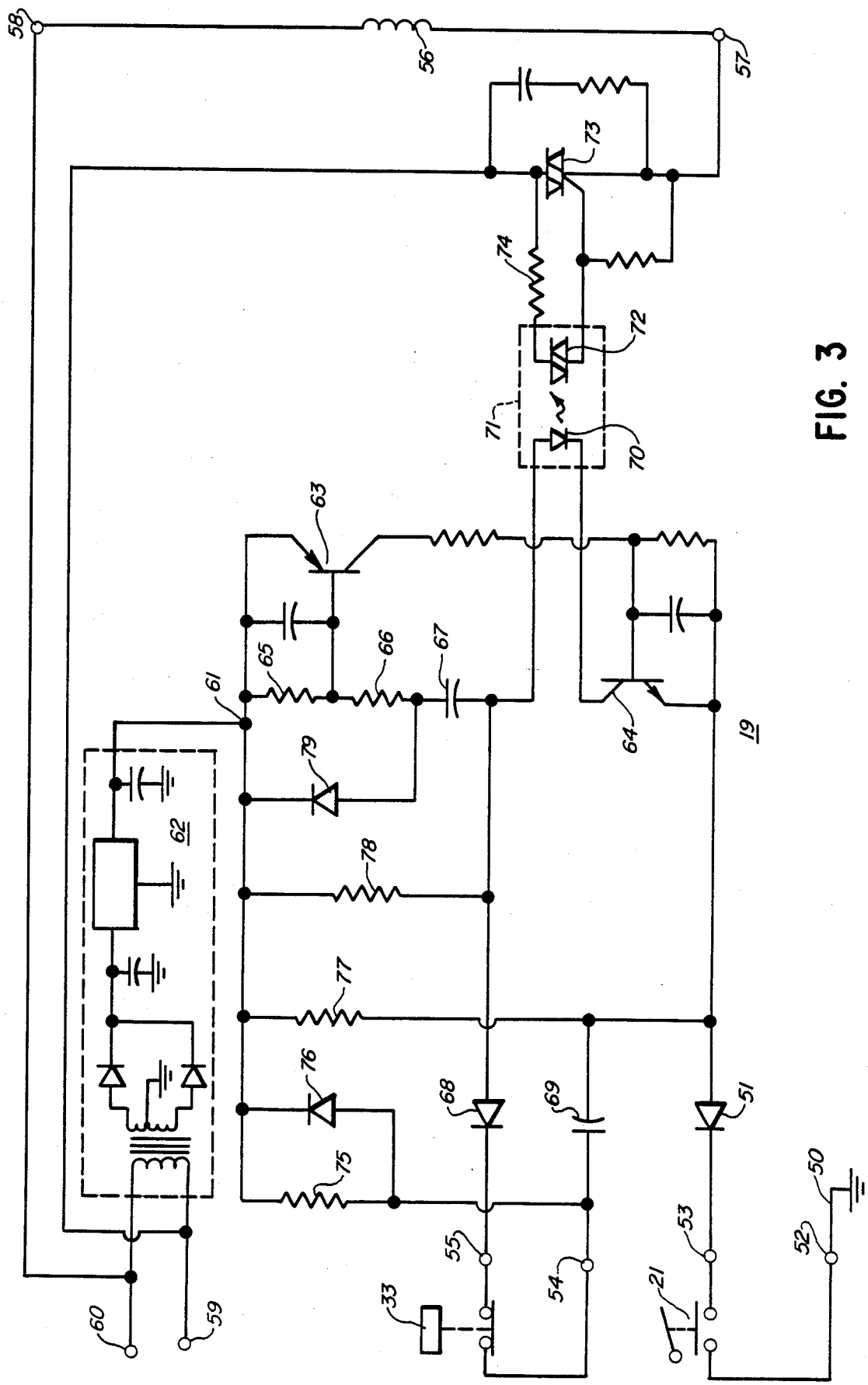
FIG. 3 is a circuit diagram of one circuit that has provided the control functions.

The operation of the inflation system is under the control of a control system shown in FIG. 3 which includes the timer 19 to provide a predetermined inflation cycle followed by a predetermined measuring cycle. In the preferred embodiment, the inflation cycle is approximately 3 seconds while the measuring cycle is approximately 1 second. These can be adjusted to meet the needs and satisfy the requirements of any given design and operating system. Referring first to FIG. 1, the operation of this system will be generally described. An operator places a rim on the table 8 of tire changer 9 with a tire loosely fitted into the drop center of the rim and ready for sealing and inflation in the well known manner. The operator then depresses foot pedal 23 first causing actuation of inflation valve 11 and timer switch 21. Further depression of the foot pedal 23 actuates the larger bead sealing valve 37 and causes high velocity air to produce a seal between the rim and the tire on table 8. Once the seal has been created, the operator may relax the pressure on foot pedal 23 somewhat maintaining actuation of switch 21 and valve 11 while deactuating valve 37.

With the intermediate pedal position, the inflation system begins its operation. The sequence of operations of this system are generally as follows. Opening of valve 11 by the foot pedal applies air pressure to the conduit 13d and actuation of switch 21 will cause the timer to open the solenoid valve 15 to pass air pressure through the pressure sensing switch 33 and the bleed valve 27 to the air hose 13f and the air chuck 16. The chuck 16 will be in place on the valve stem of the tire resting on table 8. The timer permits air flow through the path just described for approximately 3 seconds when the timer closes valve 15 for a measuring cycle of approximately 1 second. During the measuring cycle the air stabilizes within the system including conduit 13e, air hose 13f, pressure responsive switch 33, bleed valve 27 and gauge 17. The pressure responsive switch 33 is generally set to respond to a pressure in the order of 45 psi to prevent over inflation of automobile and similar vehicle tires. The line pressure at conduit 13 may be in the order of 150 psi. Thus, during the inflation portion of the cycle, the pressure at switch 33 may exceed 45 psi and usually will exceed 45 psi even though the pressure measured at gauge 17 during the measuring portion of the cycle will be considerably less. This provides regulated flow of air into the tire and also a safety device whereby a careless operator or malfunctioning system will still not permit the tire to be inflated to more than 45 psi. When a pressure in the tire greater than that desired is registered on gauge 17, the operator may depress the push-button on bleed valve 27 and relieve the pressure in the tire down to the desired level such as 32 psi.

The control system is designed so that once a timer cycle is initiated, and the timer completes the 3 second inflation period and less than 1 second measuring period, the control system will not automatically recycle but the operator must remove his foot from pedal 23 and then depress the pedal again to reinitiate the timing cycle. Thus the system requires continuous operator attention, at least to the extent that he must consciously operate the foot pedal to the reset position by releasing pressure on pedal 23 and then re-depressing pedal 23 for each 3 second charge of air to the tire being inflated. This he can do until the pressure in the tire during the measuring period reaches 45 psi or whatever pre-set pressure is provided by switch 33 and thereafter further actuation of the pedal 23 will not provide further inflation of the tire.

The manner in which the timer functions will be described with respect to FIG. 3. FIG. 3 represents the portion of the control system 10 which is disposed within the timer block 19 of FIG. 1, with the pressure switch, foot switch and solenoid winding also shown for clarity. The foot switch 21 is connected between ground and a diode 51 at terminals 52 and 53. The pressure switch 33 is connected to the timer circuit 19 at terminals 54 and 55. The solenoid valve 15 includes a winding 56 which is connected to the timer 19 at terminals 57 and 58. Finally, A/C power is provided to the timer 19 at terminals 59 and 60.

When the foot switch 21 is actuated, it completes the ground or return circuit 50 for the timer which has its D/C power applied at terminal 61 from a conventional 12 volt power supply generally designated 62. When foot switch 21 is closed, voltage is applied across the serially connected transistors 63 and 64 and current also flows through resistors 65 and 66, capacitor 67, diode 68, capacitor 69, and diode 51 to provide a bias and cause transistor 63 and thus transistor 64 to conduct. This causes current to flow through the light emitting diode 70 in optical coupler 71 which in turn actuates the light responsive device 72 to fire the triac 73 through resistor 74.

When the triac 73 is caused to conduct, the solenoid 56 is energized from the A/C power supply 59 and 60 which opens second valve 15 and permits air to be applied to the tire through the open foot valve 11 and open solenoid valve 15. When the pressure in line 13e reaches the preset pressure of pressure switch 33, that pressure switch opens breaking the circuit between diode 68 and capacitor 69. When that occurs, capacitor 69 remains charged through the network comprising resistor 75, diode 51, and foot switch 21. Concurrently capacitor 67 discharges through the network comprising resistors 65 and 66, resistor 78 and diode 79.

While the capacitor 67 is charging, the current drop across resistor 65 causes the transistor 63 to conduct for a time period determined by the size of capacitor 67 and its charging path. The time constant of these components establishes the "inflate" time. The components are selected to provide approximately a 3 second "on" time after which air flow is terminated.

Following termination of air flow, the system will stabilize and if the pressure within the stabilized system falls below 45 psi, then the pressure switch 33 recloses, enabling reactuation of the system for a second cycle of inflation. However, as long as the foot switch 21 has been maintained in the closed position, capacitor 69 will remain charged through resistor 75 and diode 51 and reclosing of the pressure switch 33 will not permit additional current flow to turn transistor 63 back on. Upon releasing the foot switch 21, the capacitor 69 is discharged through the resistor 75 and diode 76 in series with resistor 77 conditioning the circuit for a further cycle. This reset time is less than one second in the preferred embodiment.

Thus, if the foot pedal 23 is again depressed, closing foot switch 21, current will flow from the power supply terminal 61 through resistor 65 and 66 and capacitor 67, diode 68, pressure switch 33, capacitor 69, diode 51, and the foot switch 21 to turn the transistor on again and cause a complete recycling of the timer mechanism providing the 3 second on time as determined by the size of capacitor 67 and related components and a less than 1 second off time provide by the discharge time for capacitor 69.

Thus, the applicant has provided an improved system for regulating the inflation of tires. This system inflates pneumatic tires with manually initiated cycles of alternate inflating and measuring steps. It provides a construction which minimizes the expensive manufacture and assembly and allows the operator to quickly and safely inflate a pneumatic tire to a desired pressure level.

While the applicant has shown one embodiment of the present invention, one will understand, of course, that the invention is not limited to this embodiment since those skilled in the art to which the invention pertains may make modifications and other embodiments of the principles of the invention, particularly upon considering the foregoing teachings. The applicant, therefore, by the appended claims, intends to cover any modifications and other embodiments which incorporate those features which constitute the essential features of this invention.

What is claimed is:

1. A system for regulating the inflation of pneumatic tires, said system connected to an air supply conduit through which pressurized air flows between an inlet which communicates with an air supply source and an outlet which communicates with a pneumatic tire, said system comprising: first valve means serially connected to an air supply conduit to allow flow through said air supply conduit; second valve means serially connected to said air supply conduit between said first valve means and said outlet of said conduit; a manually openable activating member disposed proximate said first valve means and movable between a first reset position and a second activating position; first reset switch means disposed proximate said manually operable activating member; timing control means operatively connected to said second valve means and to said first reset switch means, said timing control means, upon actuation by said first reset switch means, opening said second valve means for a first predetermined period of time for inflating a pneumatic tire and closing said second valve means for a second predetermined period of time for measuring and indicating the air pressure in said pneumatic tire; said manually operable activating member opening said first valve means and actuating to a closing position said first reset switch means when in said second position; and said first reset switchmeans actuating said timing control means when said manually operable activating member is in said second activating position and actuating said timing control means again only position upon movement of said manually operable activating member to said first reset position and then to said second activating position for repeating the inflating and measuring cycle.

2. The system of claim 1 further comprising preset pressure switch means disposed between said second valve means and said outlet of said conduit and operatively connected with said timing control means, said preset pressure switch means being responsive to the pressure in said pneumatic tire and disabling said timing control means at a predetermined pressure to prevent said timing control means from opening said second valve means.

3. The system of claim 1, wherein the activating member is a foot operated member.

4. A system for regulating the inflation of pneumatic tires, said system controlling the flow of pressurized air through an air supply conduit between a conduit inlet which communicates with an air supply source and a conduit outlet which communicates with a pneumatic tire, said system comprising: first valve means serially connected to an air supply conduit to allow flow through said air supply conduit between said air supply conduit inlet and said air supply conduit outlet; second valve; means serially connected to said air supply conduit between said first valve means and said conduit outlet; manually operable activating means for said first valve means movable between a first reset position and a second activating position; reset switch means operatively controlled by said manually operable activating means; timing control means operatively connected to said second valve means and to said reset switch means, said timing control means, upon actuation by said reset switch means, opening said second valve means for a first predetermined period of time for inflating a pneumatic tire and closing said second valve means for a second predetermined period of time for measuring and indicating the air pressure in said pneumatic tire ; said manually operable activating means opening said first valve means and actuating to a closing position said reset switch means when in said second activating position; and said reset switch means actuating said timing control means when said manually operable activating means is in said second activating position and actuating said timing control means again only upon movement of said manually operable activating means to said first reset position and then to said second activating position for repeating the inflating and measuring cycle.

5. The system of claim 4 further comprising preset pressure switch means disposed between said second valve means and said air supply conduit outlet and operatively connected with said timing control means, said preset pressure switch means being responsive to the pressure in said air supply conduit and disabling said timing control means at a predetermined pressure to prevent said timing control means from operating said second valve means after said second predetermined time period.

6. The system of claim 4 further comprising an air gauge member disposed between said second valve means and said air supply conduit outlet, said air gauge member operative to provide a measurement of pressure in said air supply conduit.

7. The system of claim 6 further comprising a bleed valve member disposed between said second valve means and said air supply conduit outlet, said bleed valve member manually operative to provide exhaust of air from said air supply conduit to atmosphere.

8. The system of claim 4 wherein said second valve means comprises a electric solenoid valve member.

* * * * *

UNITED STATES PATENT AND TRADEMARK OFFICE
CERTIFICATE OF CORRECTION

PATENT NO. : 4,850,402

DATED : July 25, 1989

INVENTOR(S) : Charles L. Cunningham
Robert E. Gwaltney

It is certified that error appears in the above-identified patent and that said Letters Patent is hereby corrected as shown below:

Column 4, line 34, after "11" insert --is--.

Column 4, line 67, delete "supplies" (second occurrence).

Column 7, line 17, "provide" should be --provided--.

Column 7, line 48, "openable" should be --operable--.

Column 7, line 63, before "position" insert --activating--.

Column 7, line 63, "switchmeans" should be --switch means--.

Column 7, line 67, delete "position".

Signed and Sealed this

Twenty-fifth Day of December, 1990

*Attest:*

HARRY F. MANBECK, JR.

*Attesting Officer*     *Commissioner of Patents and Trademarks*